United States Patent
Yamashita et al.

[11] Patent Number: 5,431,453
[45] Date of Patent: Jul. 11, 1995

[54] PIPE COUPLING ARRANGEMENT

[75] Inventors: Tamotsu Yamashita; Hideshige Homma, both of Osaka, Japan

[73] Assignee: Suiken Technology Co., Ltd., Osaka, Japan

[21] Appl. No.: 219,289

[22] Filed: Mar. 28, 1994

[30] Foreign Application Priority Data

Apr. 28, 1993 [JP] Japan ................... 5-022647

[51] Int. Cl.⁶ ............................................. F16L 21/08
[52] U.S. Cl. ........................... 285/93; 285/322; 285/404; 285/332; 285/339; 285/141
[58] Field of Search ............... 285/232, 255, 322, 323, 285/324, 339, 90, 332, 385, 421, 404, 141, 337, 93

[56] References Cited

U.S. PATENT DOCUMENTS

| 3,239,307 | 4/1941 | Weber | 285/337 X |
| 3,254,752 | 9/1941 | Penick et al. | 285/141 |
| 3,326,926 | 8/1943 | Cowles | 285/404 X |
| 3,700,270 | 10/1972 | Howard | 285/337 |
| 4,650,226 | 3/1987 | Babbitt et al. | 285/141 X |
| 5,152,555 | 10/1992 | Szcho | 285/93 |
| 5,332,043 | 7/1994 | Ferguson | 285/322 X |

FOREIGN PATENT DOCUMENTS

| 39091 | 9/1936 | Netherlands | 285/404 |
| 960664 | 6/1964 | United Kingdom | 285/404 |

Primary Examiner—Eric K. Nicholson
Assistant Examiner—Heather Chun Shackelford
Attorney, Agent, or Firm—Nikaido, Marmelstein, Murray & Oram

[57] ABSTRACT

A pipe coupling arrangement for coupling an end of a pipe section includes a coupling body having its open end, into which the end of the pipe section is inserted. An outer ring and a radially compressed inner ring are disposed in the open end of the coupling body. Inclined peripheries are respectively defined in the inner periphery of the outer ring and the outer periphery of the inner ring. These inclined peripheries are inclined so as to become smaller in diameter as they advances towards the open end of the coupling body. The inclined periphery of the outer ring and that of the inner ring are engaged by each other. A pressing means for pressing an outer periphery of the outer ring is provided such that the inner ring is tightly pressed against an outer periphery of the pipe section via the outer ring. A space is defined by the inclined surface of the outer ring and the outer periphery of the pipe section, into which the inner ring is inserted.

6 Claims, 4 Drawing Sheets

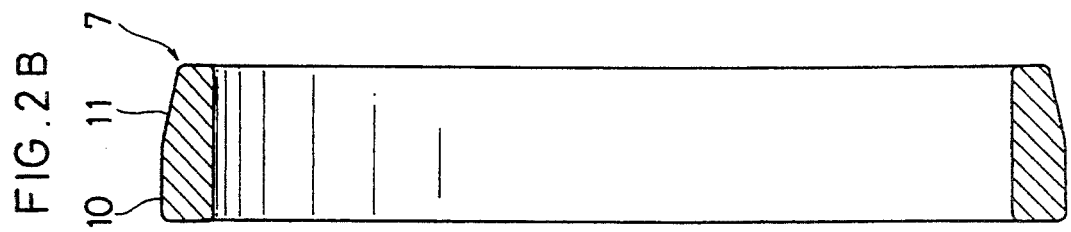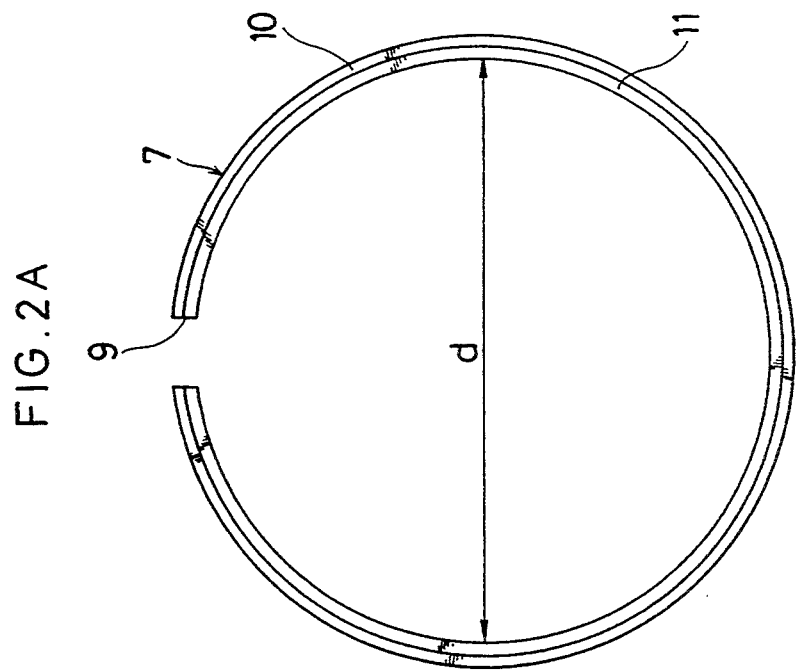

PIPE COUPLING ARRANGEMENT

BACKGROUND OF THE INVENTION

This invention relates to a pipe coupling arrangement and more particularly to a pipe coupling arrangement adapted for readily and securely coupling an end of a pipe section.

A prior pipe coupling arrangement is disclosed for example in Japanese Laid-Open No. 59-27386 as illustrated in FIG. 4, in which an anchor 19 is disposed in a pressing ring 18 and a set screw 20 is received by a bore defined in an outer periphery of the pressing ring 18. With this arrangement, as the set screw 20 is screwed into the bore, the anchor 19 is moved in the axial direction thereof and is forcibly pressed into a diametrally smaller region of an inclined surface 18a defined in an inner periphery of the pressing ring 18. The anchor 19 is then forced to be compressed radially such that protuberances 21, which protrude from an inner periphery of the anchor 19, bite against an outer periphery of a pipe section II. Whereby, the pipe section II is connected to a pipe section III.

However, such a prior arrangement is disadvantageous in the fact that since the pressing force effected by the set screw 20 is applied onto the anchor 19 slantingly relating to the pipe section II, this pressing force may not be sufficiently applied onto the pipe section B, resulting in the insufficient biting of the protuberances 21 against the pipe section II. Under such a state, the pipe section B happenes to be dropped off from the pipe section III, which is a serious problem in the pipe coupling arrangement of this type.

SUMMARY OF THE INVENTION

It is an object of the present invention to securely and rigidly couple an end of a pipe section with ease.

Accordingly, there is provided a pipe coupling arrangement for coupling an end of a pipe section comprising a coupling body having its open end, into which the end of the pipe section is inserted, an outer ring disposed in the open end of the coupling body, an inner periphery of the outer ring having an inclined periphery inclined so as to become smaller in diameter as it advances towards the open end of the coupling body, a radially compressible inner ring disposed in the open end of the coupling body, an outer periphery of the inner ring having an inclined periphery inclined so as to become smaller in diameter as it advances towards the open end of the coupling body and be engaged by the inner periphery of the outer ring, a pressing means for pressing an outer periphery of the outer ring such that the inner ring is tightly pressed against an outer periphery of the pipe section via the outer ring, and a space is defined by the inner surface of the outer ring and the outer periphery of the pipe section, into which the inner ring is inserted.

With the above arrangement, the end of the pipe section is inserted into the coupling body. Then, the inner ring is pressed radially and inwardly by the pressing force of the pressing means via the outer ring which is disposed in the open end of the coupling body. Whereby, the inner ring is forcibly and radially compressed such that its inner periphery is tightly contact with the outer periphery of the pipe section. The pipe section is thus hermetically connected to the coupling body.

In this state, once pulling force is applied onto the pipe section, the inner ring is forced to be intruded into the space defined between the inner surface of the outer ring and the outer periphery of the pipe section, which renders the pipe section to move in the direction of the pulling force. Accordingly, the pulling force applied onto the pipe section is absorbed. Furthermore, since the pressing force is inwardly applied onto the inner ring due to a so-called anchor function which is effected by a relative movement between the inclined peripheries of the outer ring and inner ring, the pressing force applied from the inner ring towards the pipe section increases, thus avoiding the dropping off of the pipe section from the coupling body.

BRIEF DESCRIPTION OF THE DRAWINGS

The above, and other objects, features and advantages of the present invention will become apparent from the detailed description read in conjunction with the accompanying drawings, which are given by way of illustration only, and thus are not limitative of the present invention, and wherein:

FIGS. 2A and 2B respectively illustrate a rear view and a partially sectional view of one embodiment of an inner ring;

DETAILED DESCRIPTION OF THE PREFERRED EMBODIMENTS

Embodiments of the present invention will be described in accompanying with the drawings attached hereto.

Figure 1:
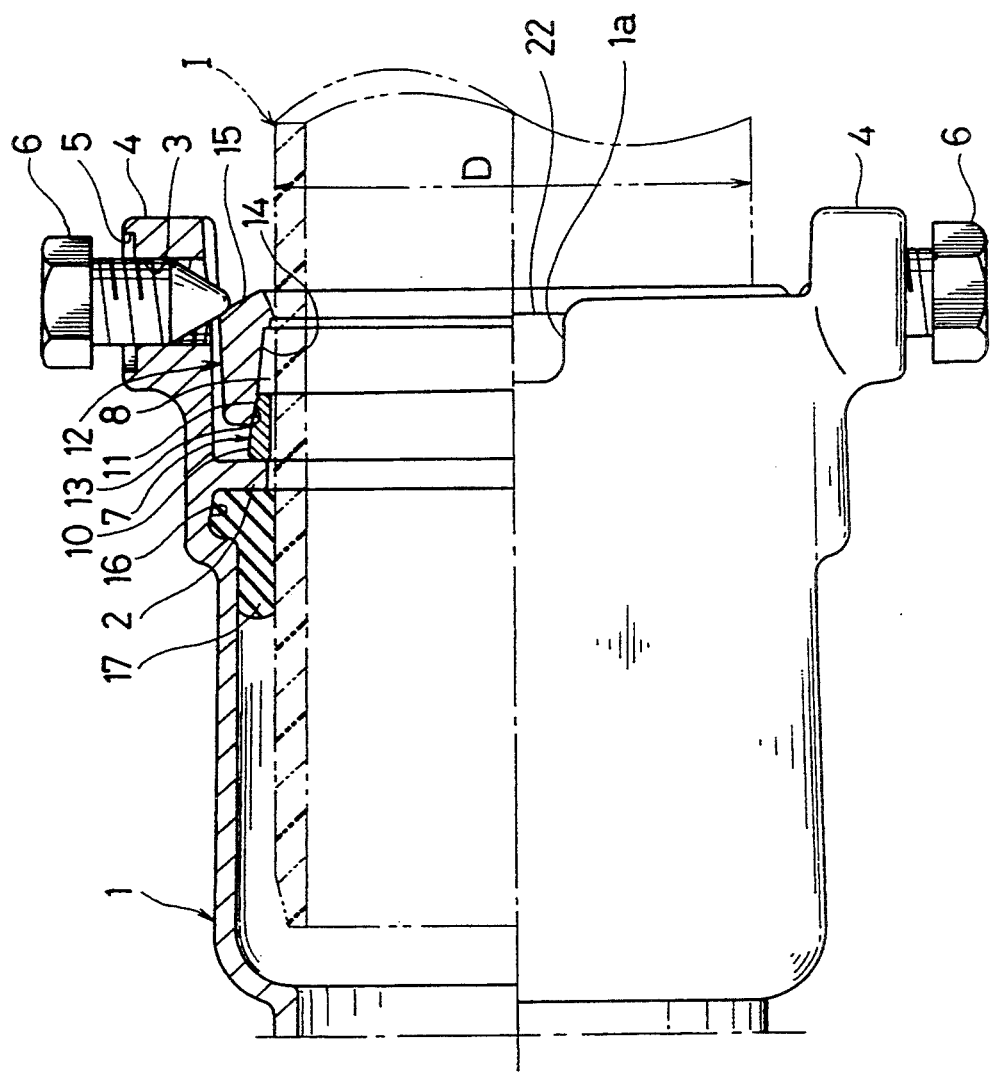
FIG. 1 is a partially sectional view illustrating one embodiment of a pipe coupling arrangement of the present invention.

Referring to FIG. 1, there is illustrated a coupling body generally designated by the numeral 1. An end of a pipe section I is inserted into an open end of the coupling body 1. On an inner periphery of the coupling body is formed a radially projecting wall 2. A pair of externally projecting portions 4 are disposed on the open end of the coupling body 1 so as to face each other. An inwardly threaded bore 3 is defined on an end portion of each of the externally projecting portions 4. A cut-away portion 1a is defined in the open end of the coupling body 1. A seat 5 is defined in an outer periphery of the externally projecting portion 4 so as to be coaxially aligned with the threaded bore 3. A set screw 6 with its circular cone shaped tip portion, is screwed into the threaded bore 6 of the externally projecting portion 4. An inner ring 7 is disposed in the open end of the coupling body 1, which has a partially cut-away portion 9 as illustrated in FIG. 2A. The inner ring 7 has an inner diameter larger than an outer diameter D of the pipe section I to be coupled. An outer periphery of the inner ring 7 has an inclined periphery which is defined by a first inclined surface 10, diameter of which becomes gradually smaller as it advances towards the open end of the coupling body 1, and a second inclined surface 11 which is inclined in the same direction as the first inclined surface provided that its inclined angle is larger than that of the first inclined surface 10, as illustrated in FIG. 2B.

An outer ring 12 is likewise disposed in the open end of the coupling body 1. An inner periphery of the outer ring 12 has an inclined periphery which is defined by a third inclined surface 13 with its inclined angle same as the second inclined surface 11, and a fourth inclined surface 14 with its inclined angle same as the first inclined surface 10. The diameter of the inner periphery of the outer ring 12 becomes gradually smaller as it advances towards the open end of the coupling body 1. On an outer periphery of the outer ring 12 is formed the fifth inclined surface 15 which is engageable by the tip portion of the set screw 6. An annular concave 16 is defined in the inner periphery of the coupling body 1 along an inner surface of the partially projecting wall 2. A packing 17 is disposed in the annular concave 16 so as to hermetically seal between the coupling body 1 and the pipe section I.

In accordance with the above arrangement, before transporting or coupling operation of a device with the coupling arrangement of the present invention, the inner ring 7 and the outer ring 12 are disposed in the open end of the coupling body 1 and the set screw 6 is screwed into the threaded bore 3 such that the tip portion thereof is engaged by the first inclined surface 13. Whereby, the dropping off of the both rings 7 and 12 from the coupling body 1 can be effectively avoided, thus contributing to easy handling in transportation and coupling operation.

Figure 3A:
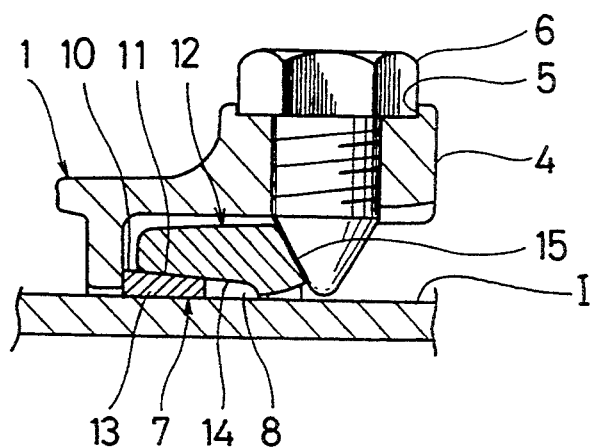
FIGS. 3A and 3B are partially enlarged sectional views illustrating actual use of the pipe coupling arrangement of the present invention.
Figure 3B:
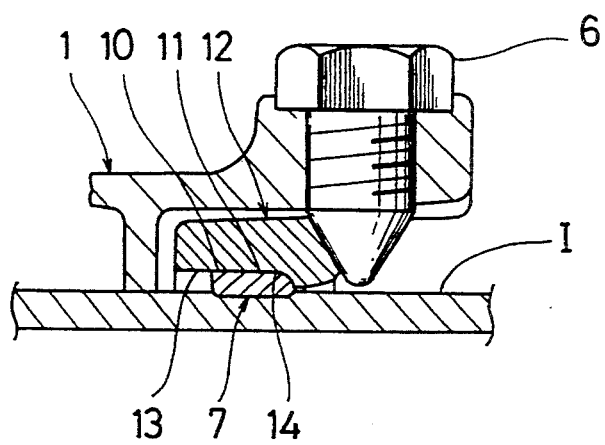
Figure 4:
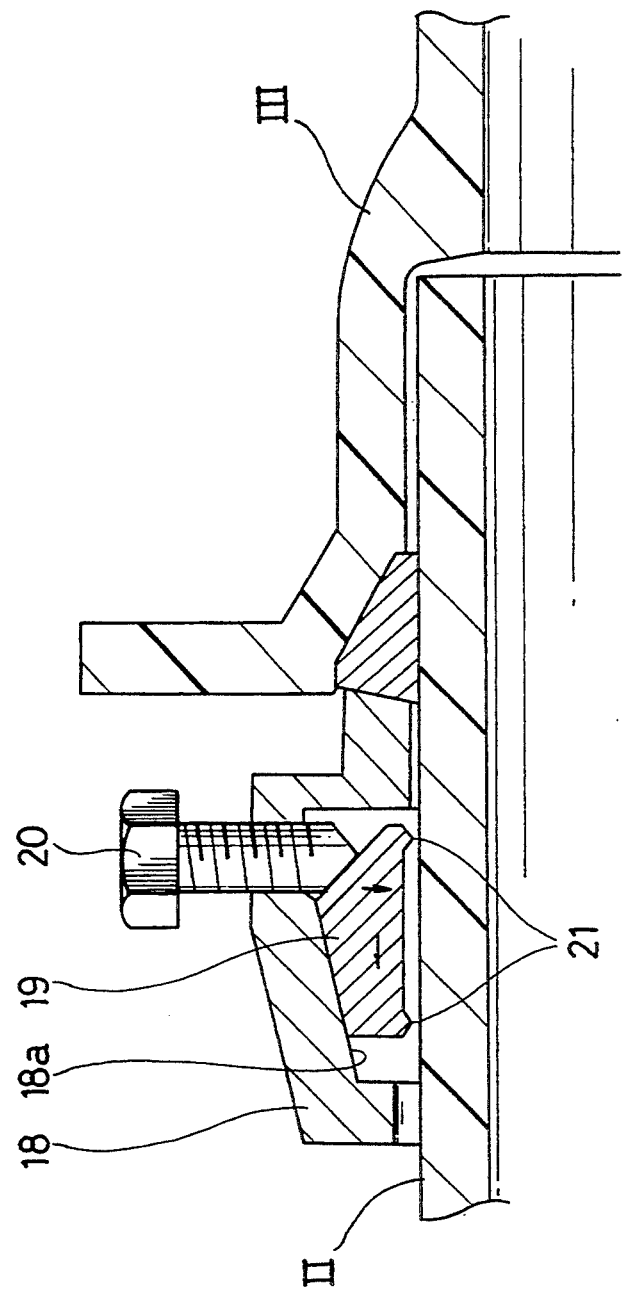
FIG. 4 is a partially enlarged sectional view illustrating a prior pipe coupling arrangement.

Referring to FIGS. 3A and 3B, when the pipe section I which is made of for example vinyl chloride is to be joined with the coupling body 1 of the above arrangement, the end of the pipe section I is first inserted into the coupling body 1 via the open end thereof. Next, the set screw 6 is screwed into the threaded bore 3 such that the tip portion thereof presses the fifth inclined surface 15 of the outer ring 12, and forcibly moves the outer ring 12 towards the inner ring 7. Accordingly, the inner ring 7 is subjected to inwardly applied pressing force with the result that the inner ring 7 is radially compressed and tightly contacts the outer periphery of the pipe section I.

To uniformely screw the set screw 6 in every coupling operation and to further facilitate the coupling operation, the depth of the seat 5 defined in the externally projecting portion 4 and the height of the set screw 6 may be determined such that the pipe section I is held hermetically and securely in the coupling body 1 via the inner ring 7 after the reverse side of the head of the set screw 6 abuts against the seat 5 by screwing the set screw 6 into the threaded bore 3.

Furthermore, the outer ring 12 may preferably be provided on its outer periphery with an indication line 22 which extends in the circumferential direction of the outer ring 12. The indication line 22 can be observed from outside via the cut-away portion 1a of the coupling body 1 for giving a visible warning when the pipe section I is insufficiently coupled with the coupling body 1.

The pipe section I may be angularly joined with the coupling body 1 by adjusting the screwed length of each of set screws 6, while likewise maintaining the preferable sealing condition of the packing 17 and avoiding the accidental dropping off of the pipe section I from the coupling body 1.

Accordingly, the pipe section I is hermetically pressed via the whole surface area of the inner periphery of the inner ring 7 so as to be securely and rigidly connected to the coupling body 1.

Furthermore, the coupling operation can be made merely by the insertion of the pipe section I into the coupling body 1 and the screwing of the set screws 6 into the corresponding bores 3. In addition, the undesirable coupling state of the pipe section I can be readily corrected by unscrewing the set screws 6. Thus, the coupling operation can be effectively and readily carried out even at an actual job site.

When the pulling force of more than a predetermined degree is applied onto the pipe section I, the inner ring 7 is forcibly inserted into the space 8 defined by the fourth inclined surface 14 and the outer periphery of the pipe section I. Thus, the pulling force is absorbed, preventing the pipe section I from dropping. When the inner ring 7 is inserted into the space 8, the first inclined surface 10 with its smaller inclined angle is engaged by the second inclined surface 14 such that the pressing force effected by the inner ring 7 towards the pipe section I gradually increases. Therefore, even if the pulling force is suddenly applied onto the pipe section I, the pipe section I is not subjected to any damages and is held in the coupling body 1 with suitable degree of the pressing force via the inner periphery of the inner ring 7, whereby avoiding the dropping off of the pipe section I from the coupling body 1.

Although the inclined peripheries of the outer ring 12 and the inner ring 7 are respectively defined by differently inclined surfaces, it is a matter of course that each of these peripheries may be defined by a single inclined surface.

Although the outer ring 12 is pressed with a pair of the set screws 6 in this embodiment, varying number of the set screw 6 may be employed depending on for example the diameter of the pipe section I. Furthermore, pressing means for pressing the outer ring 12 is not limited to the set screw 6.

The pipe section I is preferably made of vinyl chloride in this embodiment. However, steel or other materials may be employed for the pipe section I. When steel is employed, a wall of the pipe may be thinly made.

Furthermore, the specific shape of the coupling body 1 and the specific order of a series of the coupling operation is not limited to those described in the above embodiment.

This specification is by no means intended to restrict the present invention to the preferred embodiments set forth therein. Various modifications to the inventive pipe coupling arrangement, as described herein, may be made by those skilled in the art without departing from the spirit and scope of the present invention.

What is claimed is:

1. A pipe coupling arrangement for coupling an end of a pipe section comprising a coupling body having an open end, into which the end of the pipe section is inserted, an outer ring disposed in the open end of the coupling body, an inner periphery of the outer ring having an inclined periphery inclined so as to become smaller in diameter as it advances towards the open end of the coupling body, a radially compressible inner ring disposed in the open end of the coupling body, an outer periphery of the inner ring having an inclined periphery inclined so as to become smaller in diameter as it advances towards the open end of the coupling body and be engaged by the inclined periphery of the outer ring, a pressing means for pressing an outer periphery of the outer ring such that the inner ring is tightly pressed against an outer periphery of the pipe section via the outer ring, and a space is defined by the inclined surface of the outer ring and the outer periphery of the pipe section, into which the inner ring is inserted, wherein the inclined periphery of the inner ring is defined by a first inclined surface and a second inclined surface with its inclined angle larger than that of the first inclined surface, and the inclined periphery of the outer ring is defined by a third inclined surface with its inclined angle same as that of the second inclined surface and a fourth inclined surface with its inclined angle same as that of the first inclined surface.

2. The pipe coupling arrangement as set forth in claim 1, wherein the pressing means comprises a plurality of set screws, each of which having a cone shaped tip portion and being screwed into a corresponding internally threaded bore which is defined in the open end of the coupling body.

3. The pipe coupling arrangement as set forth in claim 1, wherein the pressing means comprises a plurality of set screws, each of which having a cone shaped tip portion and being screwed into a corresponding internally threaded bore which is defined in the open end of the coupling body.

4. The pipe coupling arrangement as set forth in claim 1, wherein the outer ring is provided on an outer periphery thereof with an indication line, and the open end of the coupling body is provided with a cut-away portion, through which the indication line can be observed from outside.

5. The pipe coupling arrangement as set forth in claim 2, wherein the outer ring is provided on an outer periphery thereof with an indication line, and the open end of the coupling body is provided with a cut-away portion, through which the indication line can be observed from outside.

6. The pipe coupling arrangement as set forth in claim 3, wherein the outer ring is provided on an outer periphery thereof with an indication line, and the open end of the coupling body is provided with a cut-away portion, through which the indication line can be observed from outside.

* * * * *